(12) United States Patent
Crivella et al.

(10) Patent No.: US 9,824,451 B2
(45) Date of Patent: Nov. 21, 2017

(54) CAMERA POSE ESTIMATION

(71) Applicant: The Boeing Company, Chicago, IL (US)

(72) Inventors: Michelle Crivella, Charleston, SC (US); Philip Freeman, Summerviell, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/093,453

(22) Filed: Apr. 7, 2016

(65) Prior Publication Data
US 2017/0294020 A1   Oct. 12, 2017

(51) Int. Cl.
*G06T 7/00* (2017.01)
*G06K 9/64* (2006.01)

(52) U.S. Cl.
CPC ............. *G06T 7/0044* (2013.01); *G06K 9/64* (2013.01); *G06T 7/0083* (2013.01); *G06K 2209/19* (2013.01); *G06T 2207/30244* (2013.01)

(58) Field of Classification Search
CPC combination set(s) only.
See application file for complete search history.

(56) References Cited

U.S. PATENT DOCUMENTS

| 5,499,306 A * | 3/1996 | Sasaki | B25J 9/1697 |
| | | | 382/153 |
| 2005/0151839 A1* | 7/2005 | Ito | G06T 15/04 |
| | | | 348/51 |

OTHER PUBLICATIONS

"Tracking of Industrial Objects by Using CAD Models"—Harald Wuest and Didier Stricker, Department of Virtual and Augmented Reality Fraunhofer IGD Darmstadt, Germany.
"Automatic Contour Model Creation Out of Polygonal CAD Models for Markerless Augmented Reality"—Juri Platonov and Marion Langer, ISMAR '07 Proceedings of the 2007 6th IEEE and ACM International Symposium on Mixed and Augmented Reality.
Chapter 2, "Three-Dimensional Pose Estimation and Segmentation Methods", C. Wohler, 3D Computer Vision, X-media.publishing, DOI 10.1007/978-1-4471-4150-1_2, Springer-Verlag London 2013.
"Single Image 3D Object Detection and Pose Estimation for Grasping", Menglong Zhu, Konstantinos G. Derpanis, Yinfei Yang, Samarth Brahmbhatt Mabel Zhang, Cody Phillips, Matthieu Lecce and Kostas Daniilidis.

(Continued)

*Primary Examiner* — Alex Liew
(74) *Attorney, Agent, or Firm* — Miller, Matthias & Hull LLP

(57) ABSTRACT

A system for determining a camera pose relative to an object including a unique feature may include a monocular camera configured to produce an image of the object, and a processing unit in operative communication with the monocular camera. The processing unit may be configured to: identify the unique feature of the object in the image produced by the monocular camera, synthesize at least four points along a contour of the object in the image using the identified unique feature as a starting point, synthesize a same number of points as synthesized in the image along a contour of the object in a reference model, the reference model preprogrammed into a memory of the processing unit, correlate the points from the reference model to the image, and determine a pose of the monocular camera based on the correlated points.

20 Claims, 5 Drawing Sheets

(56) References Cited

OTHER PUBLICATIONS

"From Contours to 3D Object Detection and Pose Estimation"—Nadia Payet and Sinisa Todorovic, Oregon State University.
Search Report for related European Application No. EP16206592.4; report dated Jun. 16, 2017.
Jayashree Karlekar, Steven Zhiying Zhou*, Weiquan Lu, Zhi Chang Loh, Yuta Nakayama, and Daniel Hii; Positioning, Tracking and Mapping for Outdoor Augmentation; Interactive Multimedia Lab, Dept. ECE, National University of Singapore; IEEE International Symposium on Mixed and Augmented Reality 2010 Science and Technology Proceedings; Oct. 13-16, 2010; pp. 175-184; Seoul Korea.

* cited by examiner

CAMERA POSE ESTIMATION

FIELD OF THE DISCLOSURE

The present disclosure relates generally to cameras and, more particularly, to camera pose estimation.

BACKGROUND OF THE DISCLOSURE

Robots with mounted cameras may be employed in manufacturing of complex products, such as aircraft. However, it is important that the robot is correctly positioned relative to the aircraft in order to prevent damage to both the robot and the aircraft. The camera mounted on the robot may be used to help determine the position of the robot. More specifically, once a pose of the camera is determined, a pose of the robot can be determined. The pose is typically defined as a position and an orientation of an object.

SUMMARY OF THE DISCLOSURE

In accordance with one embodiment, a system for determining a camera pose relative to an object including a unique feature is disclosed. The system may comprise a monocular camera configured to produce an image of the object, and a processing unit in operative communication with the monocular camera. The processing unit may be configured to: identify the unique feature of the object in the image produced by the monocular camera, synthesize at least four points along a contour of the object in the image using the identified unique feature as a starting point, synthesize a same number of points as synthesized in the image along a contour of the object in a reference model, the reference model preprogrammed into a memory of the processing unit, correlate the points from the reference model to the image, and determine a pose of the monocular camera based on the correlated points.

In a refinement, the processing unit may be further configured to use blob analysis to identify the contour of the object in the image.

In another refinement, the processing unit may be further configured to use one of pattern matching or edge detection to identify the unique feature in the image.

In another refinement, the processing unit may be further configured to divide the contour of the object in the image into equidistant segments when synthesizing the at least four points.

In another refinement, the processing unit may be further configured to divide the contour of the object in the reference model into a same number of equidistant segments as divided in the image when synthesizing the same number of points in the reference model.

In another refinement, the processing unit may be further configured to generate a rough estimate of the pose of the monocular camera from correlation of the points from the reference model to the image using a perspective-n-point problem.

In another refinement, the processing unit may be further configured to generate a refined estimate of the pose of the monocular camera by performing nonlinear optimization on the rough estimate of the pose.

In another refinement, the monocular camera may be mounted on a robot including an end effector configured to be deployed into the object, and a robot controller configured to control movement of the end effector, the robot controller in operative communication with the end effector and the processing unit.

In another refinement, the processing unit may be further configured to send a signal indicative of the refined estimate of the pose of the monocular camera to the robot controller for deployment of the end effector into the object.

In another refinement, the nonlinear optimization may be constrained between a lower optimization bound and an upper optimization bound.

In another refinement, the processing unit may be further configured to stop performance of the nonlinear optimization at a specified tolerance.

In accordance with another embodiment, a method for determining a camera pose is disclosed. The method may comprise: receiving an image of an object from a monocular camera; identifying, in the image, a unique feature of the object; using the identified unique feature as a starting point to synthesize at least four points on a contour of the object in the image; synthesizing a same number of points as synthesized in the image on a contour of the object in a computer-aided design model; correlating the points from the contour in the computer-aided design model to the contour in the image; and determining a pose of the monocular camera based on the correlated points.

In a refinement, the method may further comprise dividing the contour of the object in the image into equidistant segments starting at the identified unique feature in order to synthesize the at least four points; and dividing the contour of the object in the computer-aided design model into a same number of equidistant segments as divided in the image in order to synthesize the same number of points in the computer-aided design model as the at least four points in the image.

In another refinement, the method may further comprise using re-projection to correlate the points from the contour in the computer-aided design model to the points from the contour in the image.

In another refinement, the method may further comprise minimizing a total projection error from re-projection via gradient descent.

In another refinement, the method may further comprise converging minimization of the total projection error at a specified tolerance.

In accordance with another embodiment, a non-transitory computer-readable storage medium storing instructions which when executed by a processor determines a pose of a monocular camera relative to an object is disclosed. The non-transitory computer-readable storage medium may comprise instructions for: storing a three-dimensional (3D) reference model of the object; receiving a two-dimensional (2D) image of the object captured by the monocular camera; identifying a contour of the object in the 2D image; identifying a unique feature on the contour of the object in the 2D image; synthesizing at least four points on the contour in the 2D image by starting at the unique feature, traversing the contour, and dividing the contour into equidistant segments; synthesizing a same number of points as synthesized in the 2D image on a contour of the object in the 3D reference model; and aligning the points synthesized in the 3D reference model with the at least four points synthesized in the 2D image to generate a rough estimate of the pose of the monocular camera.

In a refinement, the non-transitory computer-readable storage medium may further comprise instructions for calculating a perspective-n-point problem on the aligned points synthesized from the 3D reference model to the 2D image in order to generate the rough estimate of the pose of the monocular camera.

In another refinement, the non-transitory computer-readable storage medium may further comprise instructions for using lens equations to calculate a total projection error based on the rough estimate of the pose of the monocular camera.

In another refinement, the non-transitory computer-readable storage medium may further comprise instructions for performing bounded nonlinear optimization to minimize the total projection error and generate a refined estimate of the pose of the monocular camera.

While the present disclosure is susceptible to various modifications and alternative constructions, certain illustrative embodiments thereof will be shown and described below in detail. The disclosure is not limited to the specific embodiments disclosed, but instead includes all modifications, alternative constructions, and equivalents thereof.

DETAILED DESCRIPTION

Figure 1:
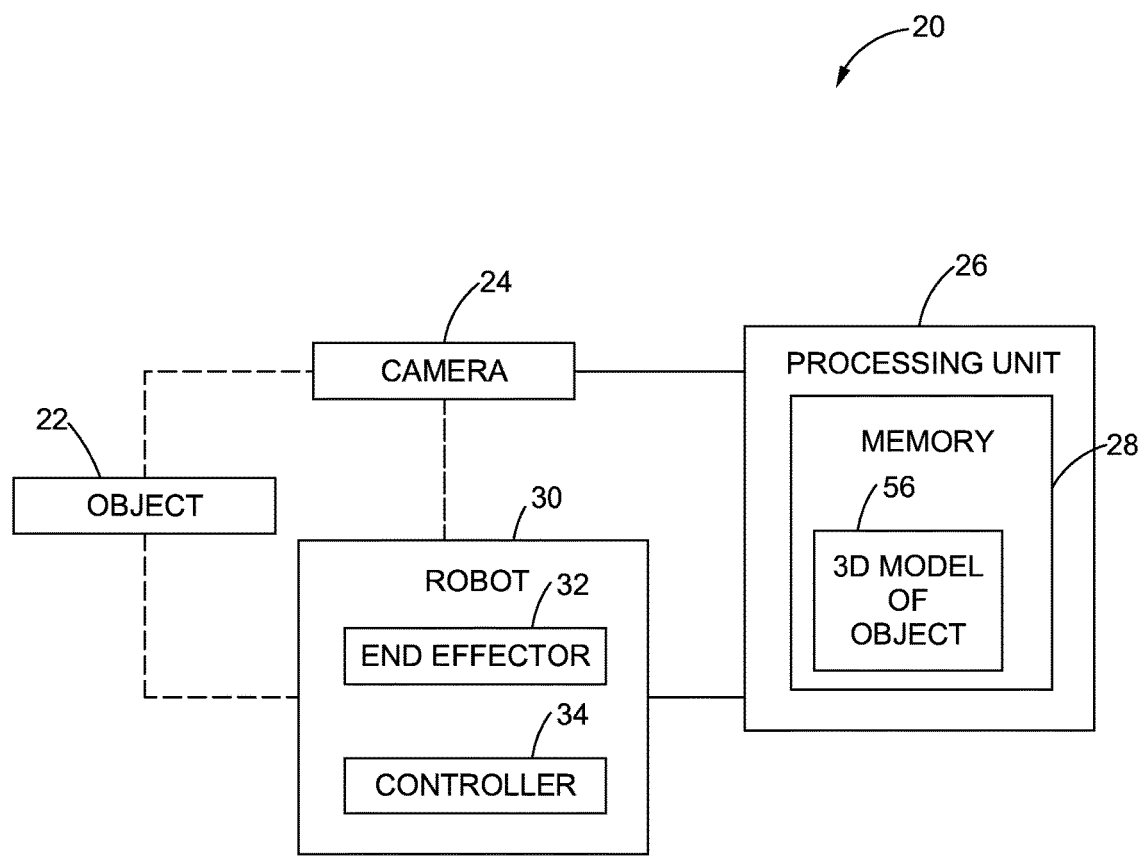
FIG. 1 is a schematic representation of a system for determining a camera pose, in accordance with one embodiment of the present disclosure.

Referring now to the drawings, and with specific reference to FIG. 1, a system 20 for determining a camera pose relative to an object 22 is shown, in accordance with certain embodiments of the present disclosure. The system 20 includes a camera 24 and a processing unit 26 in operative communication with the camera 24. The camera 24 is configured to produce a two-dimensional (2D) image of the object 22. In one embodiment, the camera 24 comprises a single calibrated monocular camera, although other types of cameras may be used.

Furthermore, the camera 24 is operatively mounted on a robot 30. However, the systems and methods disclosed herein are applicable to cameras that are not mounted on robots as well. In an embodiment, the robot 30 is configured to perform work on the object 22 and includes an end effector 32 and a robot controller 34. The end effector 32 is configured to be deployed into the object 22, while the robot controller 34 is configured to control movement of the end effector 32 and the robot 30.

Figure 2:
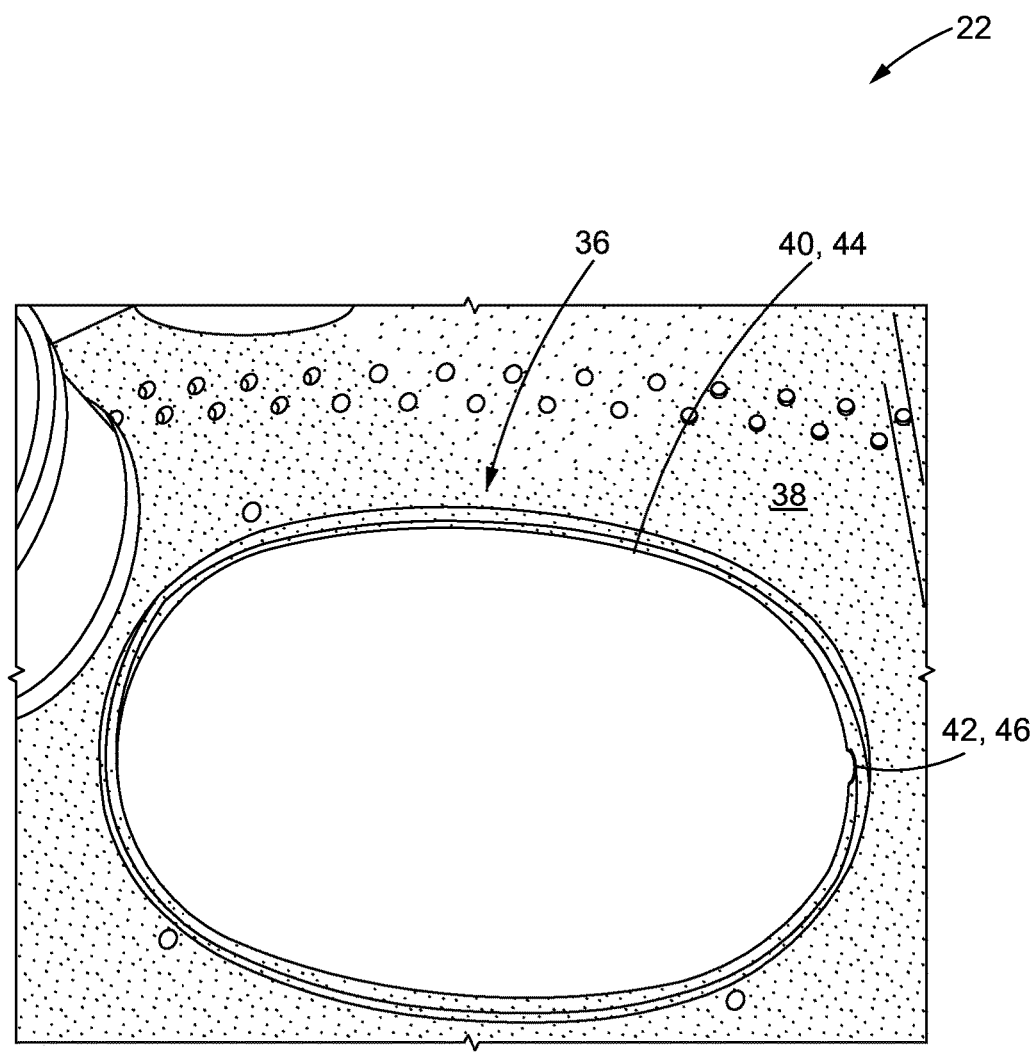
FIG. 2 is a perspective view of an aircraft wing portal, in accordance with another embodiment.

For instance, as shown in FIG. 2, the object 22 is a portal 36 in an aircraft wing 38. The object 22 includes a contour 40 and a unique feature 42. In the example of FIG. 2, the contour 40 of the object 22 is an outline 44 of the aircraft wing portal 36, and the unique feature 42 of the object 22 is a notch 46 in the outline 44 of the aircraft wing portal 36. However, the object 22, the contour 40, and the unique feature 42 can be of any other type. In addition, the object 22 may be relatively featureless except for one unique feature, or may alternatively have more than one unique feature.

In order to deploy the end effector 32 of the robot 30 into the portal 36 of the aircraft wing 38, the robot 30 is advantageously positioned in a correct location. A pose, defined herein as a position and an orientation, of the robot 30 is determined in order to correctly position the robot 30 relative to the portal 36. The robot pose can be determined from the pose, or the position and the orientation, of the camera 24 relative to the portal 36 of the aircraft wing 38. The camera pose is determined by the processing unit 26 from a 2D image of the object 22 produced by the camera 24.

Referring back to FIG. 1, the processing unit 26 is in operative communication with the camera 24 and the robot 30, such as with the robot controller 34. The processing unit 26 is implemented using one or more of a processor, a microprocessor, a microcontroller, a digital signal processor (DSP), a field-programmable gate array (FPGA), an electronic control module (ECM), an electronic control unit (ECU), and a processor-based device that may include or be associated with a non-transitory computer readable storage medium having stored thereon computer-executable instructions, or any other suitable means for electronically controlling functionality of the system 20.

For example, the processing unit 26 may be configured to operate according to predetermined algorithms or sets of instructions for operating the system 20. Such algorithms or sets of instructions may be programmed or incorporated into a memory 28 associated with or at least accessible to the processing unit 26. The memory 28 may comprise a non-volatile memory provided within and/or external to the processing unit 26. It is understood that the processing unit 26 and the system 20 may include other hardware, software, firmware, and combinations thereof.

Similarly, the robot controller 34 comprises a processor-based device with an associated memory for electronically controlling functionality of the robot 30 and the end effector 32. In one embodiment, the processing unit 26 is configured to receive the 2D image of the object 22 produced by the camera 24, determine the pose of the camera 24 relative to the object 22 using the 2D image, and send signals indicative of the determined camera pose to the robot controller 34. In this embodiment, the robot controller 34 is configured to determine the pose of the robot 30 based on the determined camera pose and position the robot 30 for deployment of the end effector 32 into the object 22 based on the determined robot pose.

Figure 3:
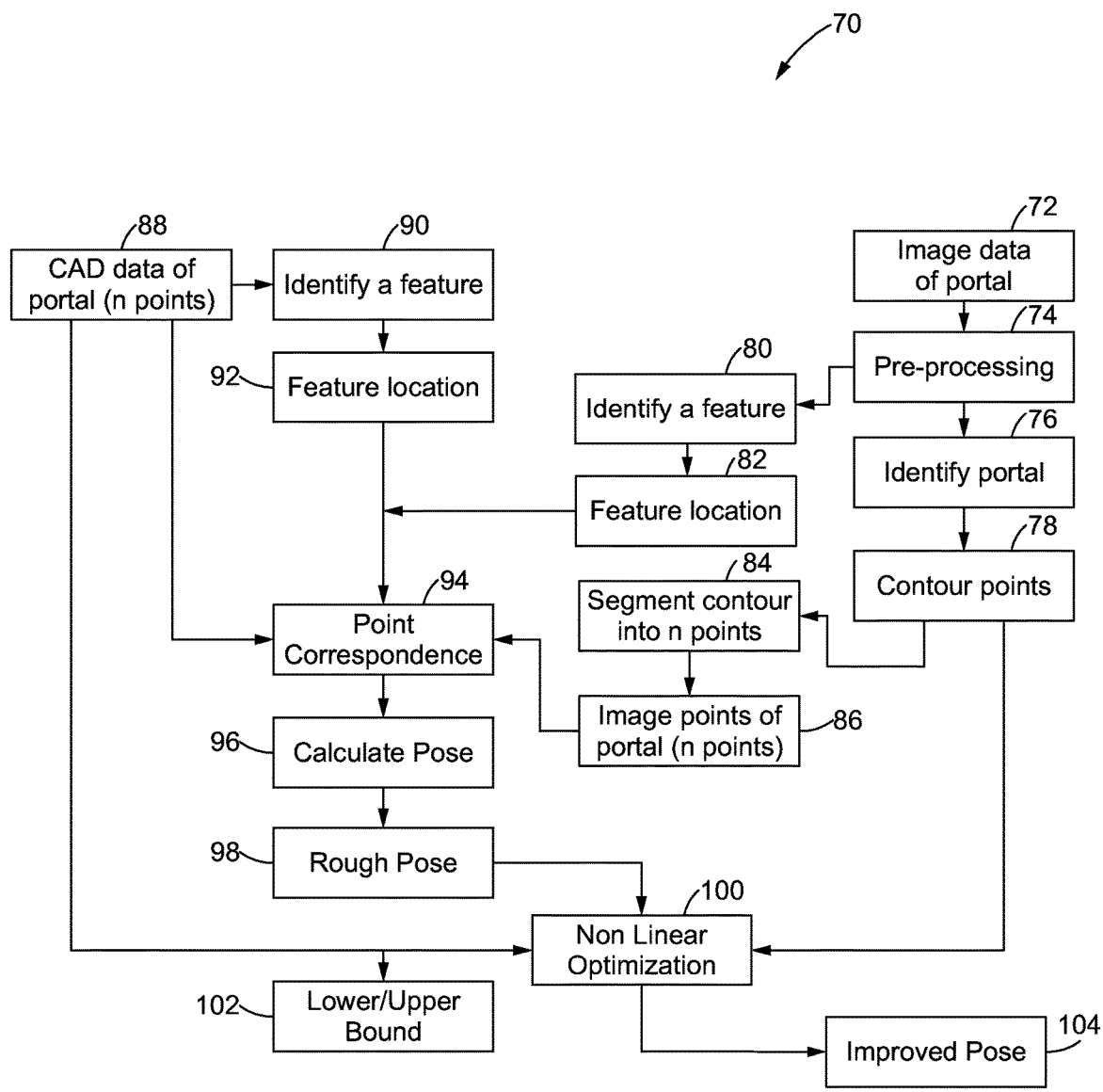
FIG. 3 is a flowchart illustrating an example process or method for determining a camera pose, in accordance with another embodiment.

Referring now to FIG. 3, with continued reference to FIGS. 1 and 2, a flowchart illustrating an example algorithm or process 70 for determining a camera pose is shown, in accordance with another embodiment. In an embodiment, the example algorithm or process 70 is programmed into the memory 28 of the processing unit 26. At block 72, the processing unit 26 receives an image of the object 22 from the camera 24. For instance, the camera 24 produces an image 48 of the portal 36, as shown in FIG. 4, and sends data indicative of the image 48 to the processing unit 26.

At block 74, pre-processing techniques are applied to the image data. Camera calibration information is used in the pre-processing techniques. Examples of pre-processing techniques include un-distortion of the image 48, conversion of the image 48 to gray-scale, and smoothing of the image 48. However, other techniques may also be used. At block 76, the object 22, such as the portal 36, is identified in the image 48. In one embodiment, blob analysis is used to identify the object 22, although other techniques may be used. For example, using blob analysis, a largest blob in the image 48 is identified as the portal 36.

At block 78, the contour 40 of the object 22 is identified in the image 48. Blob analysis and/or edge detection is used to identify the contour 40 of the object 22, such as the outline 44 of the portal 36. However, other techniques may be used. At block 80, the unique feature 42 of the object 22 is identified in the image 48. Pattern matching, edge detection, and other techniques are used to identify the unique feature 42. For instance, after the contour 40 of the object 22 is identified, the unique feature 42, such as the notch 46, is identified on the contour 40 of the object 22. At block 82, a location of the unique feature 42 in the image 48 is obtained from identifying the unique feature 42 at block 80.

Figure 4:
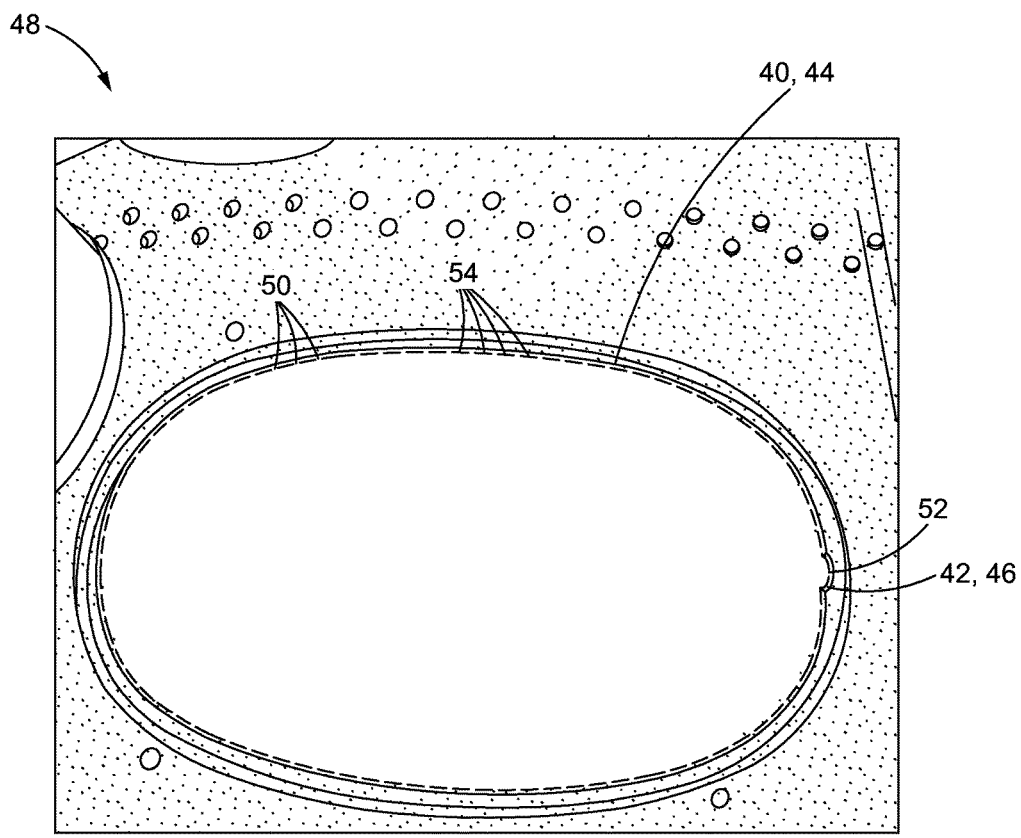
FIG. 4 is an image of the aircraft wing portal of FIG. 2 with segmented contour points, in accordance with another embodiment.

At block 84, the contour 40 of the object 22 in the image 48 is segmented into a plurality of points 50 (FIG. 4). More specifically, after identification of the unique feature 42 on the contour 40, the unique feature 42 is used as a starting point 52 (FIG. 4) to traverse the contour 40 in the image 48 and synthesize the plurality of points 50 via segmentation. Synthesis of the plurality of points 50 results in equidistant segments 54 (FIG. 4). In addition, the unique feature 42 provides a point of reference to begin contour segmentation. In an embodiment, the processing unit 26 is programmed to perform contour segmentation to synthesize the plurality of points 50 via Freeman chain code. However, other algorithms may be used.

A number for the plurality of points 50 can be predetermined and preprogrammed into the memory 28 of the processing unit 26. In an embodiment, at least four points are synthesized on the contour 40 of the object 22. The predetermined number for the plurality of points 50 may be a function of the camera 24, the object 22, a size of the object 22, and the like. In one example, the number of synthesized points may be one hundred, and in another example, the number of synthesized points may be fifty. However, other numbers of synthesized points may be used.

In the example of FIG. 4, starting at the notch 46 in the image 48, the outline 44 of the aircraft wing portal 36 is traversed in a clockwise direction or a counterclockwise direction and segmented by synthesizing the plurality of points 50. The processing unit 26 divides the outline 44 in the image 48 into equidistant points 50 and segments 54 based on the number of points preprogrammed into the memory 28. For instance, the processing unit 26 arranges the plurality of points 50 on the outline 44 such that the notch 46 is the first point on the contour 40. In so doing, contour segmentation allows for identification of only one feature of the object 22 to determine the camera pose.

Referring back to the flowchart of FIG. 3, after contour segmentation in the image 48, at block 84, the plurality of points 50 on the contour 40 of the object 22 in the image 48, or image points, are generated at block 86. At block 88, a three-dimensional (3D) reference model 56 (FIG. 1) of the object 22 is preprogrammed into the memory 28 of the processing unit 26. For instance, the reference model includes data indicative of a geometry, design, scale, and feature coordinates of the object 22 in 3D space.

Figure 5:
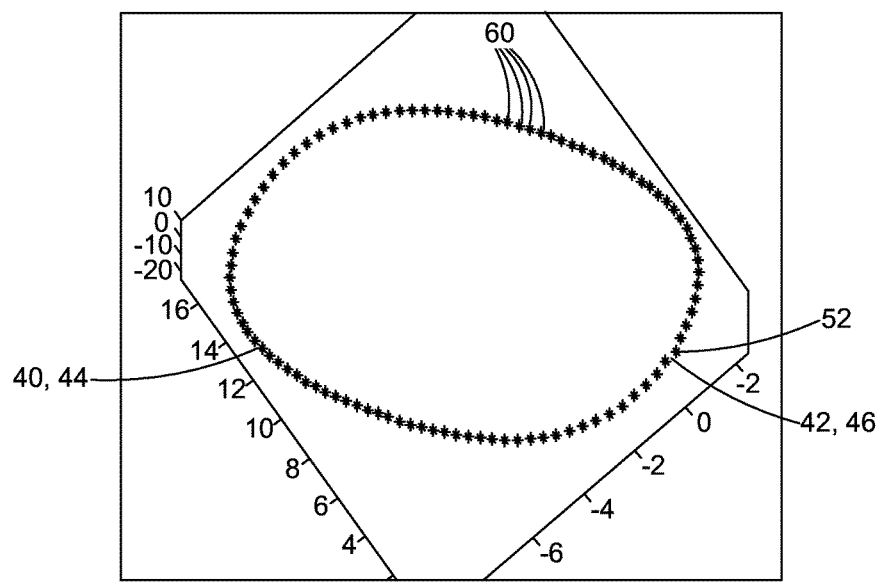
FIG. 5 is a reference model of the aircraft wing portal of FIG. 2, in accordance with another embodiment.

In one embodiment, the reference model 56 is a computer-aided design (CAD) model. An example of the reference model 56 of the aircraft wing portal 36 is shown in FIG. 5. The reference model 56 also includes the segmented contour 40 with a same number of a plurality of points 60 as synthesized in the image 48. More specifically, the same number of points is synthesized along the contour 40 of the object 22 in the reference model 56 as synthesized in the image 48.

In the example of FIG. 5, similar to contour segmentation in the image 48, the contour 40 or the outline 44 of the aircraft wing portal 36 in the reference model 56 is traversed and segmented with the unique feature 42 as the starting point. The processing unit 26 divides the outline 44 in the reference model 56 into the same number of equidistant points 60 and segments as in the image 48, based on the number of points preprogrammed into the memory 28. For instance, the processing unit 26 arranges the plurality of points 60 on the outline 44 such that the notch 46 is the first point on the contour 40 in the reference model 56.

The plurality of points 60 on the contour 40 of the object 22 in the reference model 56, or CAD data points, are generated, such as at block 88. At block 90, the unique feature 42 of the object 22 is identified in the reference model 56 using the data preprogrammed into the memory 28. At block 92, a feature location in the reference model 56 is obtained from identifying the unique feature 42. In addition, data from blocks 88, 90, and 92 associated with the reference model 56 are preprogrammed into the memory 28 of the processing unit 26.

At block 94, point correspondence between the CAD data points and the image points is determined. More specifically, the points synthesized in the reference model 56 are aligned with the points synthesized in the image 48. The plurality of points 60 from the segmented contour 40 in the reference model 56 are correlated to the plurality of points 50 from the segmented contour 40 in the image 48. For each of the correlated points in the segmented contour 40, there are (u, v) coordinates from the 2D image 48 and (x, y, z) coordinates from the 3D reference model 56.

At block 96, the camera pose is calculated based on the correlated points from block 94. In an embodiment, the perspective-n-point problem is used to calculate the camera pose using the (u, v) coordinates and the (x, y, z) coordinates for each of the correlated points. The perspective-n-point problem also uses the camera calibration information. For instance, the (u, v) coordinates, the (x, y, z) coordinates, and the camera calibration information are input into the perspective-n-point problem, which then outputs the camera pose, or the position and the orientation of the camera 24 in 3D space. At block 98, a rough estimate of the camera pose is obtained from the perspective-n-point problem.

At block 100, nonlinear optimization is performed on the rough estimate of the camera pose. The nonlinear optimization minimizes a total projection error from projection or re-projection between the CAD data points and the image points. More specifically, an error for each of the correlated points is a distance between a CAD data point and its corresponding image point, which is also known as the Euclidean distance. The total projection error is the sum of the squares of the Euclidean distances for all the correlated points. In one embodiment, the total projection error is determined using camera homography via lens equations.

For example, gradient descent, a type of nonlinear optimization, is used to minimize the total projection error. However, other types of nonlinear optimization may be used. Furthermore, at block 102, the nonlinear optimization is bounded, or constrained between a lower optimization bound and an upper optimization bound. However, the nonlinear optimization may also be unbounded.

In bounded nonlinear optimization, parameters of the camera pose, such as a translation and a rotation, are continuously modified between the lower optimization bound and the upper optimization bound. For instance, the lower and upper optimization bounds are preprogrammed into the memory 28 of the processing unit 26 based on predetermined knowledge of allowed error in the robotic manufacturing process of the object. In addition, the lower and upper optimization bounds are a function of the total projection error.

At block 104, a refined estimate of the camera pose is generated from nonlinear optimization of the rough estimate of the camera pose. The nonlinear optimization converges minimization of the total projection error when a solution is found or a change in the total projection error is less than a specified tolerance. In an embodiment, the specified tolerance is a predetermined acceptable pixel error in the robotic manufacturing process of the object.

For example, the specified tolerance is preprogrammed into the memory 28 of the processing unit 26, which is configured to stop performance of the nonlinear optimization at the specified tolerance. The refined estimate of the camera pose is used to determine the robot pose. In one embodiment, a signal indicative of the refined estimate of the camera pose generated from the nonlinear optimization and/or the robot pose is sent from the processing unit 26 to the robot controller 34 of the robot 30.

In this embodiment, based on the camera pose and/or the robot pose, the robot controller 34 then positions the robot 30 such that deployment of the end effector 32 is directed into the object 22. For instance, the robot controller 34 positions the robot 30 in a correct position for the end effector 32 to be deployed into the portal 36 without colliding into the aircraft wing 38. In so doing, damage to the robot 30 and the aircraft wing 38 may be prevented by determining a refined estimate of the camera pose.

Figure 6:
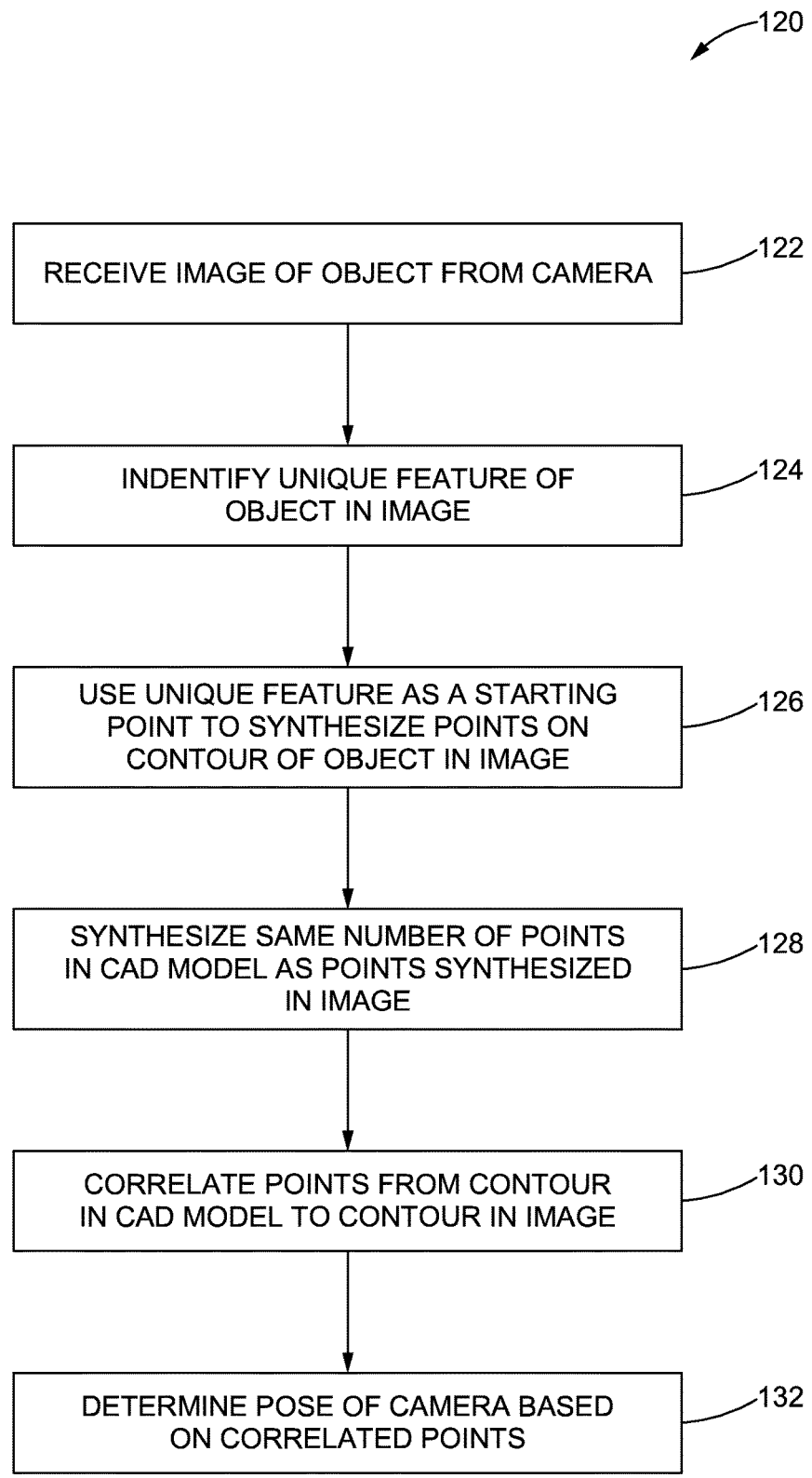
FIG. 6 is another flowchart illustrating an example process or method for determining a camera pose, in accordance with another embodiment.

Referring now to FIG. 6, with continued reference to FIGS. 1-5, a flowchart illustrating another example algorithm or process 120 for determining a camera pose is shown, in accordance with another embodiment. In an embodiment, the example algorithm or process 120 is programmed into the memory 28 of the processing unit 26. At block 122, the image 48 of the object 22 is received from the camera 24.

The unique feature 42 of the object 22 is identified in the image 48, at block 124. At least four points on the contour 40 of the object 22 are synthesized using the unique feature 42 as a starting point, at block 126. At block 128, the same number of points on the contour 40 of the object 22 in the CAD model, or reference model 56, are synthesized as the at least four points synthesized in the image 48. The points from the contour 40 in the CAD model, or reference model 56, are correlated to the contour 40 in the image 48, at block 130. At block 132, the camera pose is determined based on the correlated points.

From the foregoing, it can be seen that the teachings of this disclosure can find industrial application, technical effects and benefits in any number of different situations, including but not limited to, manufacturing of complex products, such as aircraft. The present disclosure provides systems and methods for determining a camera pose. More specifically, the disclosed systems and methods are used to determine the pose of a monocular camera. The monocular camera may be mounted to a robot used in manufacturing of aircraft.

In particular, the disclosed systems and methods identify one unique feature on a contour of an object. The disclosed systems and methods then utilize the one unique feature as a starting point for segmentation of the contour. By implementing contour segmentation, at least four points may be synthesized in the image and the reference model for solving of the perspective-n-point problem. In so doing, identification of only one unique feature is necessary to estimate camera pose, as opposed to prior art applications in which identification of four unique features was necessary to solve the perspective-n-point problem. As a result, camera pose estimation relative to a generally featureless object may be achieved.

It is to be understood that the flowcharts in FIGS. 3 and 6 are shown and described as examples only to assist in disclosing the features of the disclosed systems, and that more or less steps than shown may be included in the processes corresponding to the various features described above for the disclosed system without departing from the scope of the disclosure.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A system for determining a camera pose relative to an object including a unique feature, comprising:
   a monocular camera configured to produce a two-dimensional (2D) image of the object; and
   a processing unit in operative communication with the monocular camera, the processing unit configured to:
      identify a contour of the object in the 2D image;
      identify the unique feature of the object in the 2D image produced by the monocular camera,
      synthesize at least four points along the contour of the object in the 2D image using the identified unique feature as a starting point,
      synthesize a same number of points as synthesized in the 2D image along the contour of the object in a three-dimensional (3D) reference model, the 3D reference model preprogrammed into a memory of the processing unit,
      correlate the points from the 3D reference model to the 2D image, and
      determine a pose of the monocular camera based on the correlated points.

2. The system of claim 1, wherein the processing unit is further configured to use blob analysis to identify the contour of the object in the 2D image.

3. The system of claim 1, wherein the processing unit is further configured to use one of pattern matching or edge detection to identify the unique feature in the 2D image.

4. The system of claim 1, wherein the processing unit is further configured to divide the contour of the object in the 2D image into equidistant segments when synthesizing the at least four points.

5. The system of claim 4, wherein the processing unit is further configured to divide the contour of the object in the 3D reference model into a same number of equidistant segments as divided in the 2D image when synthesizing the same number of points in the 3D reference model.

6. The system of claim 1, wherein the processing unit is further configured to generate a rough estimate of the pose of the monocular camera from correlation of the points from the 3D reference model to the 2D image using a perspective-n-point problem.

7. The system of claim 6, wherein the processing unit is further configured to generate a refined estimate of the pose of the monocular camera by performing nonlinear optimization on the rough estimate of the pose.

8. The system of claim 7, wherein the monocular camera is mounted on a robot including an end effector configured to be deployed into the object, and a robot controller configured to control movement of the end effector, the robot controller in operative communication with the end effector and the processing unit.

9. The system of claim 8, wherein the processing unit is further configured to send a signal indicative of the refined estimate of the pose of the monocular camera to the robot controller for deployment of the end effector into the object.

10. The system of claim 7, wherein the nonlinear optimization is constrained between a lower optimization bound and an upper optimization bound.

11. The system of claim 10, wherein the processing unit is further configured to stop performance of the nonlinear optimization at a specified tolerance.

12. A method for determining a camera pose, comprising:
receiving 2D image of an object from a monocular camera;
identifying a contour of the object in the 2D image;
identifying, in the 2D image, a unique feature of the object;
using the identified unique feature as a starting point to synthesize at least four points on the contour of the object in the 2D image;
synthesizing a same number of points as synthesized in the 2D image on the contour of the object in a three dimensional (3D) computer-aided design model;
correlating the points from the contour in the 3D computer-aided design model to the contour in the 2D image; and
determining a pose of the monocular camera based on the correlated points.

13. The method of claim 12, further comprising:
dividing the contour of the object in the 2D image into equidistant segments starting at the identified unique feature in order to synthesize the at least four points; and
dividing the contour of the object in the 3D computer-aided design model into a same number of equidistant segments as divided in the 2D image in order to synthesize the same number of points in the 3D computer-aided design model as the at least four points in the 2D image.

14. The method of claim 12, further comprising using re-projection to correlate the points from the contour in the 3D computer-aided design model to the points from the contour in the 2D image.

15. The method of claim 14, further comprising minimizing a total projection error from re-projection via gradient descent.

16. The method of claim 15, further comprising converging minimization of the total projection error at a specified tolerance.

17. A non-transitory computer-readable storage medium storing instructions which when executed by a processor determines a pose of a monocular camera relative to an object, the non-transitory computer-readable storage medium comprising instructions for:
storing a three-dimensional (3D) reference model of the object;
receiving a two-dimensional (2D) image of the object captured by the monocular camera;
identifying a contour of the object in the 2D image;
identifying a unique feature on the contour of the object in the 2D image;
synthesizing at least four points on the contour in the 2D image by starting at the unique feature, traversing the contour, and dividing the contour into equidistant segments;
synthesizing a same number of points as synthesized in the 2D image on a contour of the object in the 3D reference model; and
aligning the points synthesized in the 3D reference model with the at least four points synthesized in the 2D image to generate a rough estimate of the pose of the monocular camera.

18. The non-transitory computer-readable storage medium of claim 17, further comprising instructions for calculating a perspective-n-point problem on the aligned points synthesized from the 3D reference model to the 2D image in order to generate the rough estimate of the pose of the monocular camera.

19. The non-transitory computer-readable storage medium of claim 18, further comprising instructions for using lens equations to calculate a total projection error based on the rough estimate of the pose of the monocular camera.

20. The non-transitory computer-readable storage medium of claim 19, further comprising instructions for performing bounded nonlinear optimization to minimize the total projection error and generate a refined estimate of the pose of the monocular camera.

* * * * *